（12） United States Patent
Fenton et al.

(10) Patent No.: US 6,318,129 B1
(45) Date of Patent: Nov. 20, 2001

(54) MOLD FOR USE IN I.S. MACHINE

(75) Inventors: Frank Alan Fenton, Granby; Steven J. Brown, North Granby, both of CT (US)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 09/460,584

(22) Filed: Dec. 14, 1999

(51) Int. Cl.$^7$ ................................................. C03B 9/353
(52) U.S. Cl. ........................ 65/171; 65/173; 65/323; 65/359; 65/360
(58) Field of Search .................... 65/171, 173, 323, 65/359, 360

(56) References Cited

U.S. PATENT DOCUMENTS

| 4,585,469 | * | 4/1986 | Nebelung | 65/359 |
| 5,893,942 | * | 4/1999 | Nickey et al. | 65/171 |
| 6,085,552 | * | 7/2000 | Voisine et al. | 65/158 |

* cited by examiner

*Primary Examiner*—Sean Vincent
(74) *Attorney, Agent, or Firm*—Spencer T. Smith

(57) ABSTRACT

A mold half for mounting on a mold holder of a mold open and close mechanism of an I.S. machine. The mold holder includes an insert having a central locating lug on the top thereof and an annular front face. The insert also has an annular upwardly projecting rib, on either side of the lug, the outer surface thereof defining the top portion of the annular front face and inner surface thereof defining the front wall of corresponding annular groove segments. The mold half comprises a blank diameter portion, which can have a dimension within a predetermined dimensional range, to be located adjacent the annular front face of the insert proximate the lug and a two segment annular flange projecting outwardly from the blank diameter portion to be located on either side of the lug. Each of the annular flange segments includes a downwardly projecting annular lip segment for insertion into a corresponding annular groove segment on the insert. An annular upwardly opening annular groove segment adjacent the annular downwardly projecting lip receives a corresponding one of the upwardly projecting ribs, and web portions adjacent the blank diameter portion extend outwardly from the blank diameter portion to define the inner wall of each of the annular upwardly opening groove segments. The web has a dimension that increases progressing away from the lug and which is inversely related to the size of the diameter of the blank diameter portion.

6 Claims, 5 Drawing Sheets

MOLD FOR USE IN I.S. MACHINE

BACKGROUND OF THE INVENTION

An I.S. (individual section) machine has a plurality of identical sections each of which has a blank station which receives one or more gobs of molten glass and forms them into parisons having a threaded opening at the bottom (the finish) and a blow station which receives the parisons and forms them into bottles standing upright with the finish at the top. The blank station includes opposed pairs of blankmold halves and the blow station includes opposed pairs of blowmold halves. Each of these mold halves is carried on an insert which is mounted on an arm or support which is displaceable between open and closed positions.

I.S. machines are sized according to center distances, i.e., the maximum container body diameter. Common I.S. machine center distances are double gob (TG) 4¼" and triple gob (DG) 3". Different containers require different amounts of cooling and accordingly the diameter of the mold will increase (providing more room for vertical cooling passages) with increased demand for cooling. Accordingly a DG 4¼" mold may have a 4⅝" or 5.0" band diameter and a DG 5" mold may have 4⅝", 5⅛" or 6" band diameters. The band of the mold is supported on a suitable circumferential groove defined in the supporting insert.

The one constant has been the location of the face of the mold. As a result, as the band diameter increases, the dimension of the supporting insert must inversely change. This means that each band diameter mold has its dedicated insert and that everytime that a band diameter is changed both the molds and the inserts have to be changed.

OBJECT OF THE INVENTION

It is accordingly an object of this invention to provide a mold that can be used with a universal invert.

Other objects and advantages of the present invention will become apparent from the following portion of this specification and from the accompanying drawings that illustrate in accordance with the mandate of the patent statutes a presently preferred embodiment incorporating the principles of the invention.

BRIEF DESCRIPTION OF THE PREFERRED EMBODIMENT

Figure 1:
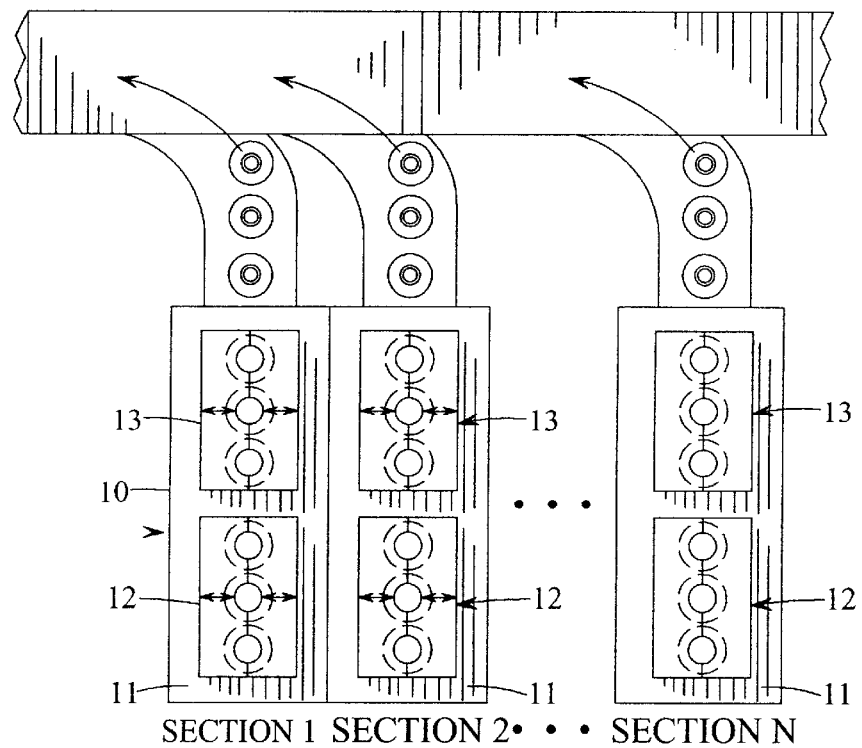
FIG. 1 is a schematic drawing of an I.S. machine having a number of identical sections each having a blank station and a blow station each having a mold open and close mechanism made up of a pair of opposed mold support mechanisms.

An I.S. machine 10 includes a plurality (usually 6, 8, 10, or 12) of sections 11. A conventional section is made up of a box-like frame or section box which houses or supports section mechanisms. Each section has a blank station 12 including a mold opening and closing mechanism carrying blankmolds which receive discrete gobs of molten glass and form them into parisons and a blow station 13 including a mold opening and closing mechanism carrying blowmolds which receive the parisons and form the parisons into bottles. One, two, three or four gobs can be processed in each section, each cycle and the machine will be referred to as a single gob, double gob, triple gob (the illustrated embodiment) or quadruple gob machine depending on the number of gobs simultaneously processed in each section during a cycle (the machine configuration).

Figure 3:
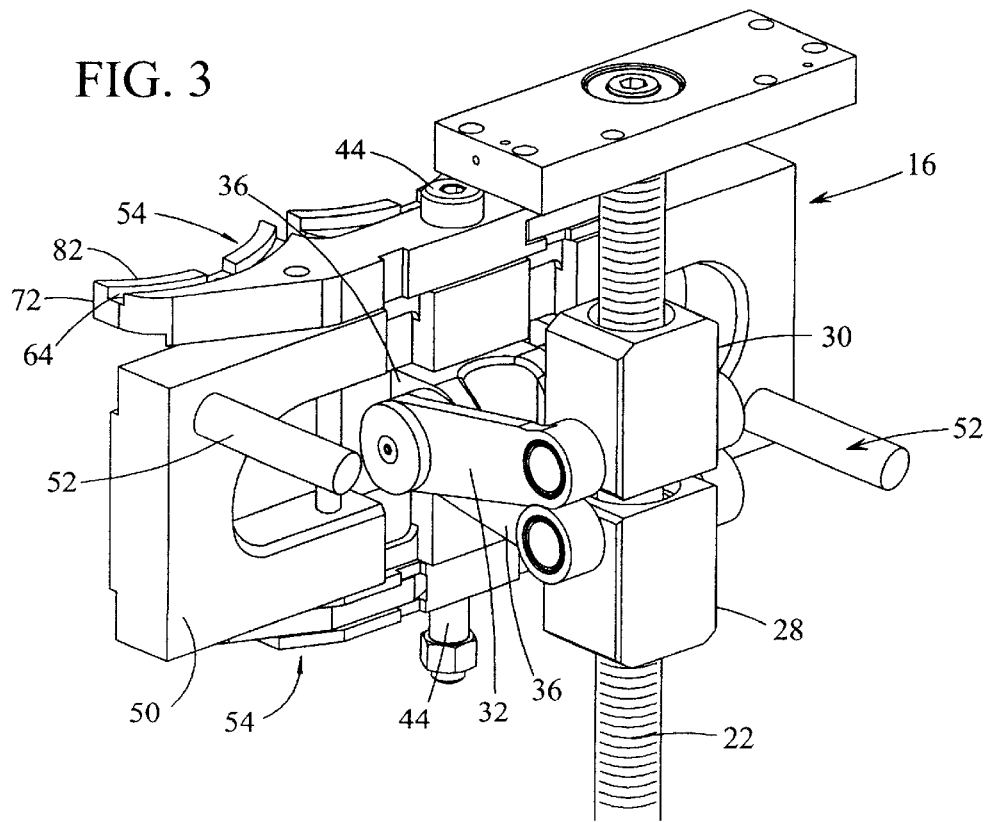
FIG. 3 is an oblique view showing a mold holder assembly secured to the transmission shown in FIG. 2.
Figure 2:
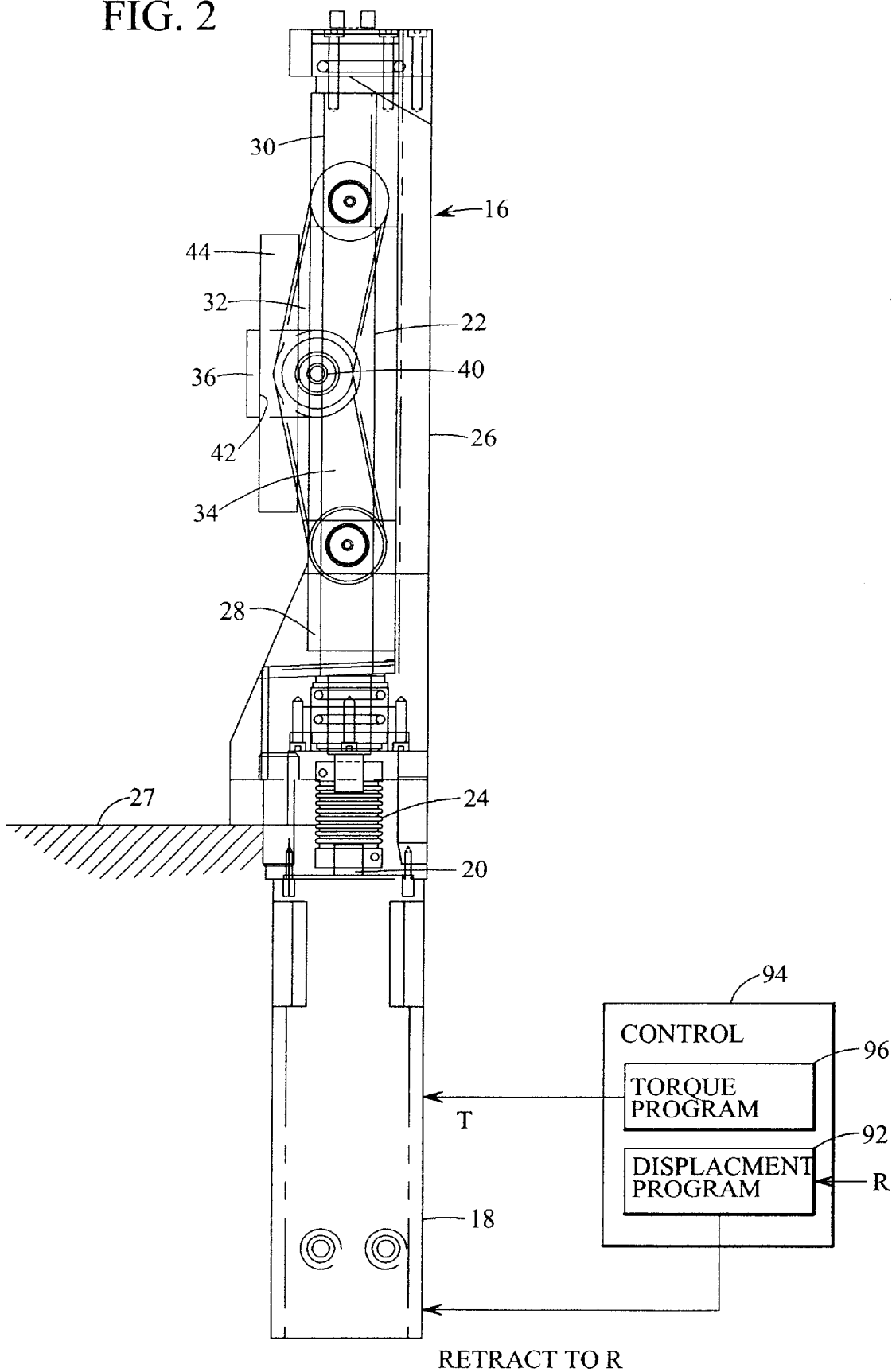
FIG. 2 is a side elevational cross sectional view of the transmission and drive assembly of one of the mold support mechanisms of a mold open and close mechanism.

Each mold open and close mechanism includes an opposed pair of mold support mechanisms 16 (FIGS. 2 and 3). The drive system for a mold support mechanism includes a servo motor 18 (with any gearbox and/or direction changer) having a rotary output in the form of a spindle 20 which is connected to a lead screw 22 (ball or Acme, for example), which has upper right hand and lower left hand thread portions, via a coupling 24. A housing 26, which is mounted on the top wall 27 of section frame, supports the lead screw 22. The lead screw is connected to a rotary to linear transmission which includes nut means comprising a lower left-hand nut 28 and an upper right hand nut 30 received by the lead screw. The rotary to linear transmission additionally comprises means for interconnecting the nuts with a mold holder, comprising a first pair of links 32 connected at one end to the upper nut 30, a second pair of links 34 connected at one end to the lower nut 28, and a yoke 36 having a horizontal bore supporting a transverse, horizontal pivot shaft 40 to which the other ends of the links 32,34 are pivotally connected. The yoke 36 also has a vertical bore 42 which pivotally receives a vertical pivot shaft 44 of the mold holder. Rotation of the lead screw in one direction will accordingly advance the mold holder towards the opposed mold support mechanism and vice versa.

Each mold holder has a carrier 50 (FIG. 3) to which guide rods 52 are secured which are received by suitable bearings (not shown) in the housing so that the mold holder can be displaced towards and away from the mold closed position. Upper and lower inserts 54, which support the mold halves, are secured to the carrier 50 by the shaft 44 which passes through vertical holes in the carrier 50, the inserts 54, and the yoke 36.

Figure 4:
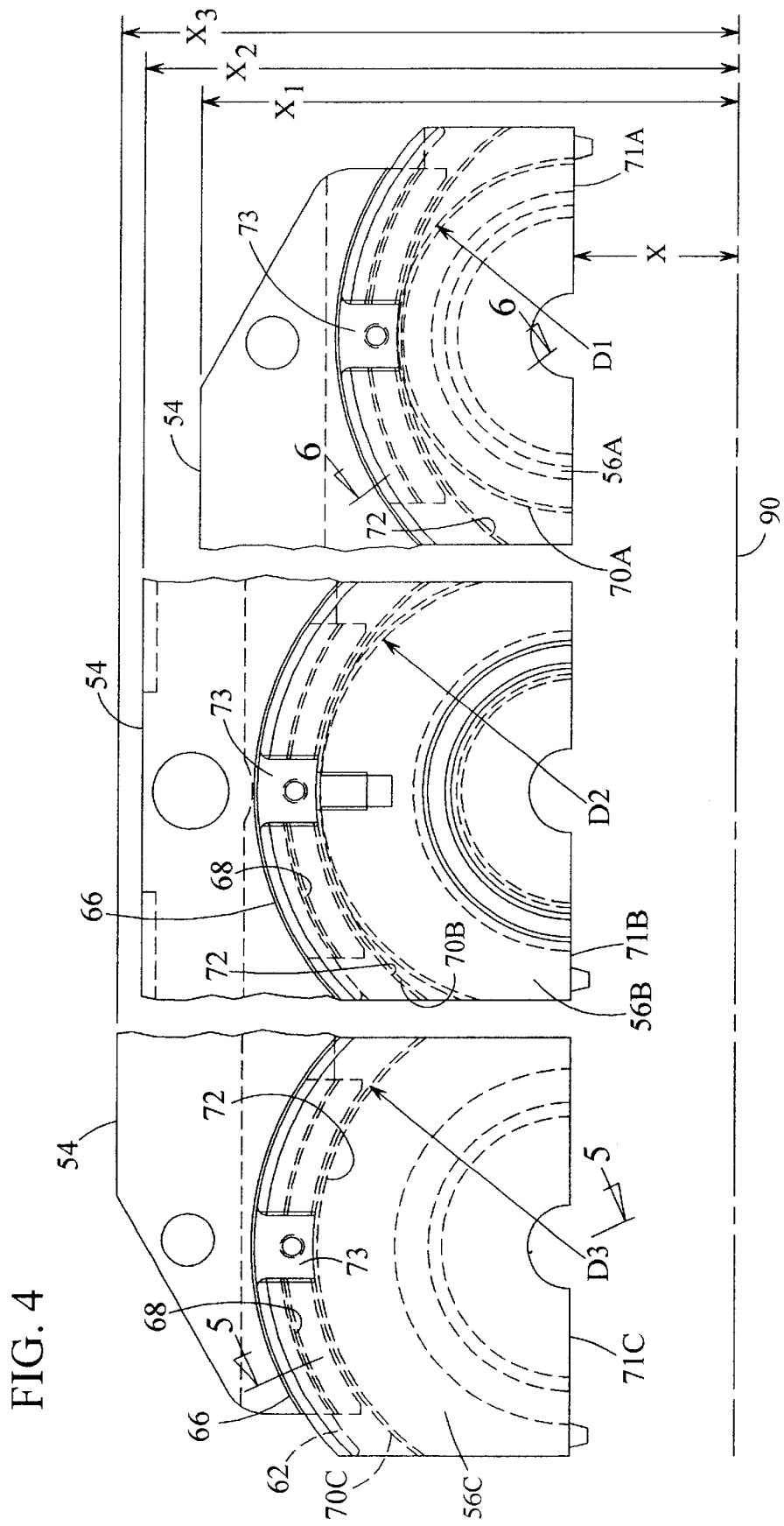
FIG. 4 is a view showing three different mold sizes mounted to an insert.
Figure 5:
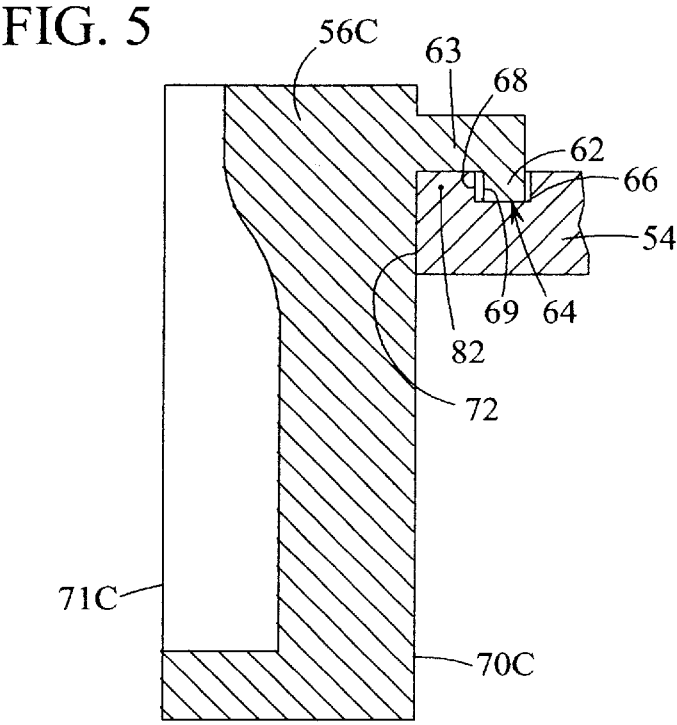
FIG. 5 is a cross sectional view taken along 5—5 of FIG. 4.
Figure 6:
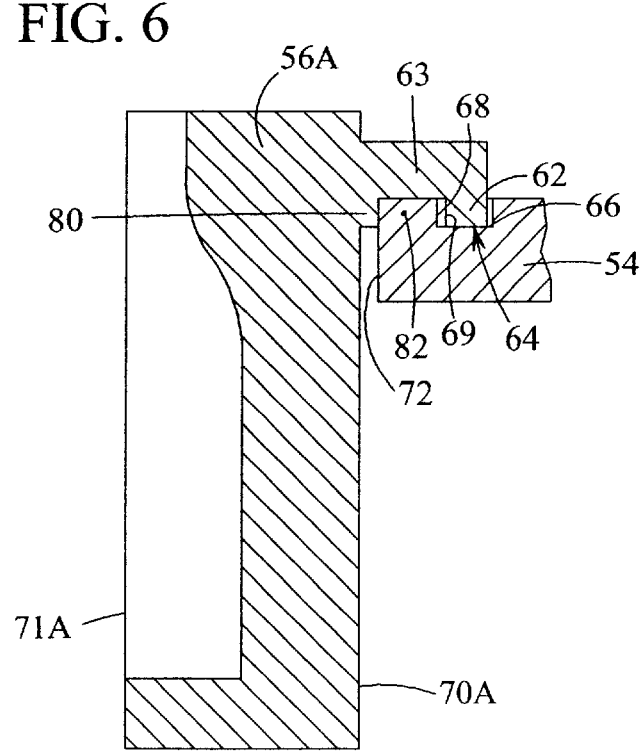
FIG. 6 is a cross sectional view taken along 6—6 of FIG. 4.

FIG. 4 shows a mold holder for a blow station, which in use will support three identical blow mold halves. Three different mold halves 56A,56B,56C having a band diameter portion 70A,70B,70C having a variety of band diameters (D1,D2,D3) which cover the range of mold diameters to be used on the machine are shown for illustrative purposes. Each mold half also has a planar clamping surface 71A, 71B,71C which will forcefully engage the corresponding surface of an opposed identical mold half when the molds are closed. Integral with the band diameter portion of each mold half, is a two segment annular flange 63 (FIGS. 5 and 6) each of which includes a downwardly projecting annular lip 62. The two segment annular lip 62 is received by a corresponding two segment groove 64 in the insert 54 (the two groove segments and the two segments of the lip are separated by a lug 73 which is secured to the insert). All three two segment grooves are defined by the same inside diameter 66 and the same outside diameter 68 which is the inside wall of an annular upwardly projecting rib 82 at the front edge of the insert.

The lips in this embodiment are shown as having concentric inner and outer surfaces (relative to the center of the largest blank diameter). In fact, as is common practice in mold design, the radius of the inner lip surface 69 proximate the rib is slightly larger than the radius of the outer lip surface to permit slight rocking movement of the mold as it is clamped at the mold closed position. Alternatively, the lip for each mold diameter could be defined by surfaces which are substantially concentric with the band diameter but tailored as required to fit within the two-segment groove.

Figure 7:
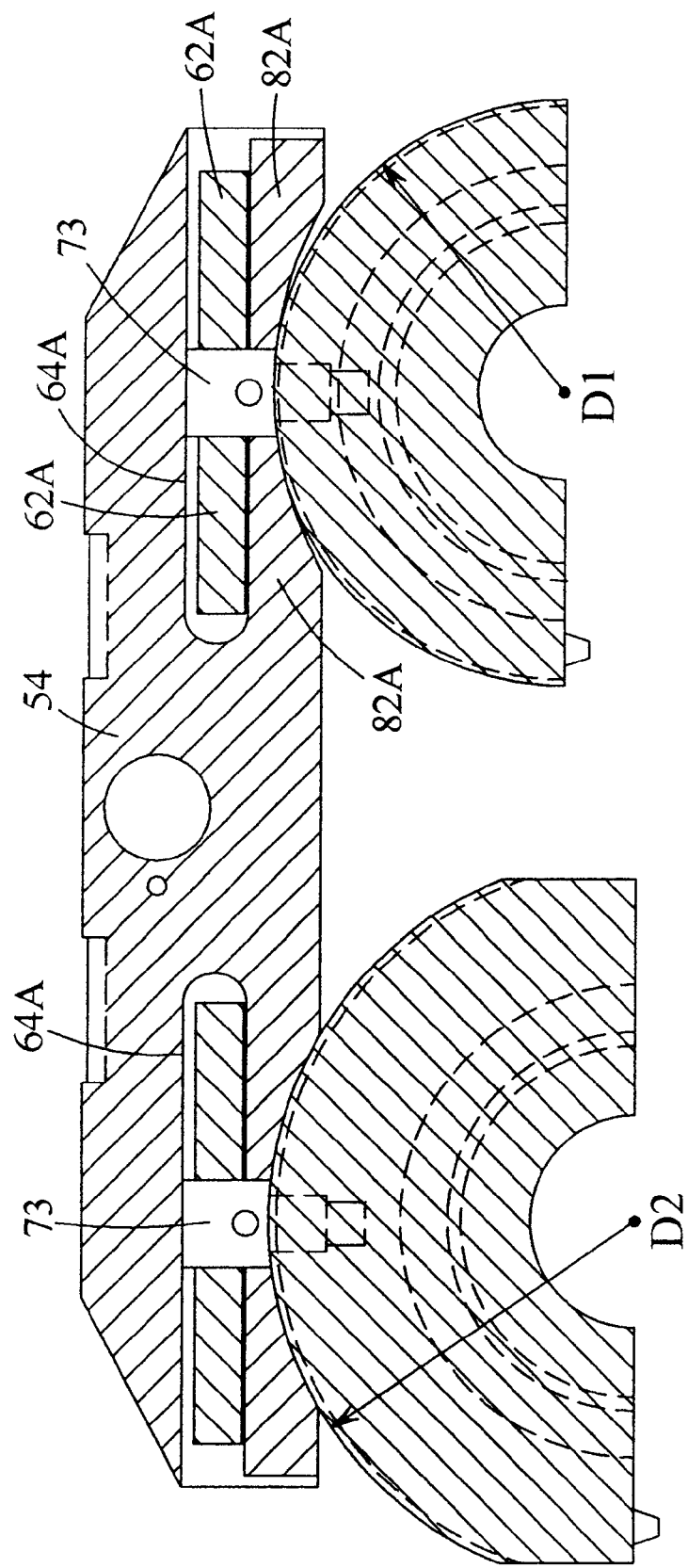
FIG. 7 is a view showing two different mold sizes mounted to an insert having an alternate embodiment.

As shown in FIG. 4, the front surface 72 of the mold receiving pockets is defined by a radius that corresponds to the radius of the band diameter 70C of the largest mold half (56C). The front surface of the insert will, at any location, accordingly be located proximate to the band diameter of the largest insert. All mold sizes (D1,D2,D3) are designed to have the mold diameter adjacent the front surface of the insert proximate the lug 73 and to have two segment lips. As can best be seen from mold 56A, the lip 62 is concentric to the blank diameter D3. Since the diameter of the lip (D3) is different than the band diameter (D1 or D2) the flange of the smaller molds will not be concentric to the smaller band diameters and a web portion 80 integral with the blank diameter will fill the space between the blank diameter and annular upwardly projecting annular rib 82 at the front of the insert. The dimension of this rib will increase proceeding away from the lug 73. In the FIG. 7 embodiment, the radius of the lips 62A and lip receiving grooves 64B are in effect infinite. In this embodiment there no rib is present but in either embodiment the rib may or may not be used.

FIG. 4 illustrates the three molds located at the open position defined by the clamping face 71 of the mold being located the dimension X from the centerline 90 of the molds. The larger the molds, the further back the mold holder will have to be retracted to locate the front face of the mold half at the retracted position. To locate the small diameter mold half (D1) at the retracted position, the mold holder will have to be displaced to R1. To locate the medium diameter mold half is (D2) at the retracted position, the mold holder will have to be displaced to R2 and to locate the large diameter mold half (D3) at the retracted position, the mold holder will have to be displaced to R3. The displacement of the servo motor 18 (FIG. 2) is controlled by a displacement program 92 of a control 94 which will retract the mold holders to a position R where the front face 71 of the molds will be a distance X from the center line 90. The difference in distance between the retracted locations of any two of these band diameters will accordingly be ½ the difference between the band diameters.

The toggle angle of the links 32 and 34 at the retracted position will vary throughout the range of mold sizes. This means that as the toggle angle gets larger, the resultant clamping force is reduced. Therefore, the control (FIG. 2) also has a torque program 96 which can apply a desired torque T as a function of the retracted position X.

What is claimed is:

1. A mold half for mounting on a mold holder of a mold open and close mechanism of an I.S. machine, the mold holder including an insert having a central locating lug on the top thereof and a front face, the insert also having a groove on the top thereof on either side of the lug, the grooves defined to receive a pair of lips which project downwardly from a two segment flange extending radially outwardly from the band diameter portion of a mold half having a maximum band diameter for the I.S. machine, said mold half comprising a band diameter portion having a band diameter smaller than the maximum band diameter, and a two segment flange projecting radially outwardly from said smaller band diameter portion to be located on top of the insert on either side of the lug, each of said flange segments including a downwardly projecting elongated lip selectively configured for insertion into a corresponding elongated groove on the insert, said two segment flange being dimensioned so that when the elongated lips are located in the elongated grooves of the insert, the band diameter portion will be located adjacent said insert face proximate the lug.

2. A mold half for mounting on a mold holder of a mold open and close mechanism of an I.S. machine according to claim 1, wherein the elongated lips of said mold half are substantially concentric about an axis parallel to and spaced from the axis of said mold band diameter portion.

3. A mold half for mounting on a mold holder of a mold open and close mechanism of an I.S. machine, the mold holder including an insert having a central locating lug on the top thereof and a front face, the insert also having, on the top thereof, a groove segment on either side of the lug, the portions of the insert extending outwardly from the elongated groove segments defining two upwardly projecting rib segments, said mold half comprising a band diameter portion having a first diameter, and a two segment flange projecting radially outwardly from said band diameter portion to be located on top of the insert on either side of the lug, each of said flange segments including a downwardly projecting elongated lip selectively configured for insertion into a corresponding elongated groove segment on the insert, said two segment flange being dimensioned so that when the elongated lips are located in the elongated groove segments, the band diameter portion will be located adjacent said insert face proximate the lug, each of said two flange segments having a downwardly opening groove adjacent said downwardly projecting lips selectively sized for receiving a corresponding one of the upwardly projecting rib segments, each of said downwardly opening grooves having a first wall proximate the blank diameter and a second wall remote from said blank diameter defining a side of a lip, the distance, in the radial direction, from the blank diameter portion of the mold to said first wall of the downwardly opening grooves increasing progressing away from the lug and the distance, at any location, being inversely related to the size of the blank diameter, and web portions adjacent said blank diameter portion extending radially outwardly from said blank diameter portion to define the first wall of each of said upwardly opening groove segments.

4. A mold half for mounting on a mold holder of a mold open and close mechanism of an I.S. machine according to claim 3, wherein said ribs and said lips are concentric to a band diameter portion having a diameter larger than said first diameter.

5. A mold half for mounting on a mold holder of a mold open and close mechanism of an I.S. machine according to claim 3, wherein said ribs and said lips extend in a direction tangent to said band diameter portion.

6. A mold half for mounting on a mold holder of a mold open and close mechanism of an I.S. machine, the mold holder including an insert having a central locating lug on the top thereof and a front face, the insert also having a groove segment on either side of the lug, the groove segments defined to receive corresponding lips which project downwardly from a two part flange extending radially outwardly from the band diameter portion of a mold half having a large band diameter portion, said mold half comprising a blank diameter portion having a band diameter portion smaller than the large band diameter portion, and a two segment flange projecting radially outwardly from the smaller blank diameter portion to be located on top of the insert on either side of the lug, each of said flange segments including a downwardly projecting elongated lip selectively configured for insertion into a corresponding elongated groove segment on the insert, said two segment flange being dimensioned so that when the elongated lips are located in the elongated grooves the band diameter portion will be located adjacent said insert face proximate the lug.

* * * * *